US011085312B2

(12) United States Patent
Fraile Martin et al.

(10) Patent No.: US 11,085,312 B2
(45) Date of Patent: Aug. 10, 2021

(54) AIRCRAFT INCORPORATING A THRUST RECOVERY SYSTEM USING CABIN AIR

(71) Applicant: AIRBUS OPERATIONS SL, Getafe (ES)

(72) Inventors: Javier Fraile Martin, Getafe (ES); Anton Mendez-Diaz, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 167 days.

(21) Appl. No.: 16/034,548

(22) Filed: Jul. 13, 2018

(65) Prior Publication Data

US 2019/0017399 A1    Jan. 17, 2019

(30) Foreign Application Priority Data

Jul. 14, 2017 (EP) ..................... 17382463

(51) Int. Cl.
*F01D 9/06* (2006.01)
*F02K 3/06* (2006.01)
(Continued)

(52) U.S. Cl.
CPC ............... *F01D 9/06* (2013.01); *B64C 21/04* (2013.01); *B64D 13/02* (2013.01); *B64D 33/00* (2013.01); *F01D 9/02* (2013.01); *F01D 25/08* (2013.01); *F02C 6/08* (2013.01); *F02K 3/06* (2013.01); *B64D 2013/0648* (2013.01); *B64D 2033/0226* (2013.01); *F05D 2220/323* (2013.01); *F05D 2220/60* (2013.01); *F05D 2240/122* (2013.01); *F05D 2240/128* (2013.01); *F05D 2260/20* (2013.01)

(58) Field of Classification Search
CPC ...... B64D 13/02; B64D 33/00; B64D 13/006; B64D 13/00; B64D 2013/0648; B64D 33/04; B64D 21/04; B64D 2033/0226; F01D 9/06

See application file for complete search history.

(56) References Cited

U.S. PATENT DOCUMENTS 4,419,926 A  12/1983  Cronin et al.
5,137,230 A   8/1992  Coffinberry
(Continued)

FOREIGN PATENT DOCUMENTS

EP    2998225    3/2016
EP    3085623   10/2016

OTHER PUBLICATIONS

European Search Report, dated Jan. 11, 2018, priority document.

*Primary Examiner* — Richard R. Green
*Assistant Examiner* — William L Gmoser
(74) *Attorney, Agent, or Firm* — Greer, Burns & Crain, Ltd.

(57) ABSTRACT

An aircraft incorporating a cabin air recovery system in which the aircraft comprises a pressurizable cabin, main turbofan engines, each turbofan engine having fan blades, a gas turbine coupled with the fan blades and a by-pass duct bypassing the gas turbine. The cabin fluidly communicates with the by-pass duct downstream of the fan blades so that, during operation, cabin outflow air is discharged into the by-pass duct downstream of the fan blades. By re-utilizing excess cabin air, engine thrust and efficiency is improved, and fuel consumption is reduced.

7 Claims, 5 Drawing Sheets

(51) Int. Cl.
*B64C 21/04* (2006.01)
*B64D 13/02* (2006.01)
*B64D 33/00* (2006.01)
*F01D 9/02* (2006.01)
*F01D 25/08* (2006.01)
*B64D 13/06* (2006.01)
*B64D 33/02* (2006.01)
*F02C 6/08* (2006.01)

(56) References Cited

U.S. PATENT DOCUMENTS

| | | | | |
|---|---|---|---|---|
| 6,045,088 | A * | 4/2000 | Saiz | B64C 23/00 244/1 R |
| 6,128,896 | A * | 10/2000 | Saiz | B64C 23/00 244/58 |
| 6,820,410 | B2 * | 11/2004 | Lair | B64D 33/04 239/265.11 |
| 2002/0134891 | A1 * | 9/2002 | Guillot | B64C 21/025 244/204.1 |
| 2012/0186282 | A1 * | 7/2012 | Army | B64D 13/00 62/93 |
| 2016/0075435 | A1 | 3/2016 | Stieger et al. | |
| 2016/0137291 | A1 * | 5/2016 | Brown | B64D 33/02 415/116 |
| 2016/0281539 | A1 * | 9/2016 | Linde | B64D 29/08 |
| 2016/0311540 | A1 | 10/2016 | DeValve | |
| 2017/0001730 | A1 * | 1/2017 | Namgoong | B64D 29/00 |
| 2017/0268430 | A1 * | 9/2017 | Schwarz | F02C 9/18 |
| 2017/0370242 | A1 * | 12/2017 | Bacic | F01D 11/24 |

\* cited by examiner

AIRCRAFT INCORPORATING A THRUST RECOVERY SYSTEM USING CABIN AIR

CROSS-REFERENCES TO RELATED APPLICATIONS

This application claims the benefit of the European patent application No. 17382463.2 filed on Jul. 14, 2017, the entire disclosures of which are incorporated herein by way of reference.

BACKGROUND OF THE INVENTION

The present invention refers in general to aircraft air systems, like bleed air and air-conditioning systems.

An object of the invention is to improve efficiency of an aircraft bleed system, by re-utilizing excess cabin air in order to increase the engine thrust and efficiency.

Another object of the invention, is to reduce fuel consumption caused by the extraction of cooling air from the engine fan duct.

Most current civil aircraft incorporate a bleed system that takes pressurized air from one of the engine compressor stages, to be used as a source of pressurized air for cabin pressurization and temperature conditioning purposes.

This pressurize air from the engine is cooled down before being distributed along the aircraft using cold air from the engine fan. However, extracting cold air from the engine fan duct decreases engine efficiency and increases fuel consumption.

An important portion of the air supplied to the cabin for pressurization and temperature conditioning has to be fresh air, which means that part of the air is discharged overboard with no real energy recovery.

In some existing aircraft, this air is discharged through an outflow nozzle trying to recover some small thrust, but the efficiency of this technique has proven to be very low.

On the other hand, a turbofan is a type of jet engine commonly used for aircraft propulsion. In contrast with a turbojet wherein all intake air passes through the gas turbine, a turbofan is a combination of a turbine and a ducted fan, wherein some air bypasses the gas turbine. The ratio of the amount of air bypassing the turbine, compared with the amount of air passing through the turbine, is commonly defined as the by-pass ratio. The overall thrust provided by a turbofan is the sum of both flows.

It is known to inject cabin air outflow somewhere upstream the engine fan or in the low pressure compressor. However, re-injecting cabin air outflow at the engine inlet, where the fan air pressure at that point is lower than that of the cabin air, is not a very efficient solution because the cabin air outflow has to be compressed again in the fan, which increases the power consumption of the engine, so that, for that reason, this solution has never really been implemented.

SUMMARY OF THE INVENTION

The present invention is based on re-utilizing cabin excess air which is traditionally discharged to the atmosphere with no effective energy recovery, to be injected at the by-pass duct of a turbofan main engine of an aircraft and downstream of the fan blades. In this way, excess cabin air is re-used in order to increase the turbofan thrust and efficiency.

The current generation of aero engines are based on a very low pressure ratio and high bypass ratio turbofans, and the trend is to continue reducing the fan pressure ratio of future engines. This implies a fan air static pressure lower than the pressure of the cabin air outflow.

Therefore, nowadays the pressure at the bypass duct downstream of the fan blades is so low that the cabin excess air can be directly injected in the bypass duct in order to increase the engine thrust without any penalty on energy consumption, which is directly translated into aircraft and engine efficiency optimization.

One aspect of the invention refers to an aircraft incorporating a cabin air recovery system, wherein the aircraft conventionally comprises a pressurizable cabin, main turbofan (or fanjet) engines, wherein each turbofan engine has a gas turbine coupled with fan blades and a by-pass duct bypassing the gas turbine. According to the invention, the cabin is fluidly communicated with the by-pass duct downstream of the fan blades, so that, during operation of the aircraft, cabin outflow air is discharged into the by-pass duct downstream of the fan blades.

The cabin air airflow injected downstream of the engine fan, increases the speed of a portion of the fan air thrust, thereby increasing engine performance, that is, reducing fuel consumption for the same thrust for equivalent operating conditions.

Taking into account that aerodynamic instabilities, such as turbulence or boundary layer separation, are the main reasons for pressure and energy losses in the fan by-pass duct, additionally according to the invention, the cabin outflow air is injected in selected locations of the by-pass duct downstream of the fan blades, in order to advantageously controlling these aerodynamic losses and improve the secondary flow efficiency by means of the energy increase at the boundary layer.

The main advantages of the invention can be summarized as follows:
fuel consumption reduction;
turbofan thrust increase;
turbofan efficiency optimization;
reduction of pressure and energy losses of the turbofan due to aerodynamic instabilities.

BRIEF DESCRIPTION OF THE DRAWINGS

Preferred embodiments of the invention are henceforth described with reference to the accompanying drawings, wherein.

DETAILED DESCRIPTION OF THE PREFERRED EMBODIMENTS

Figure 1:
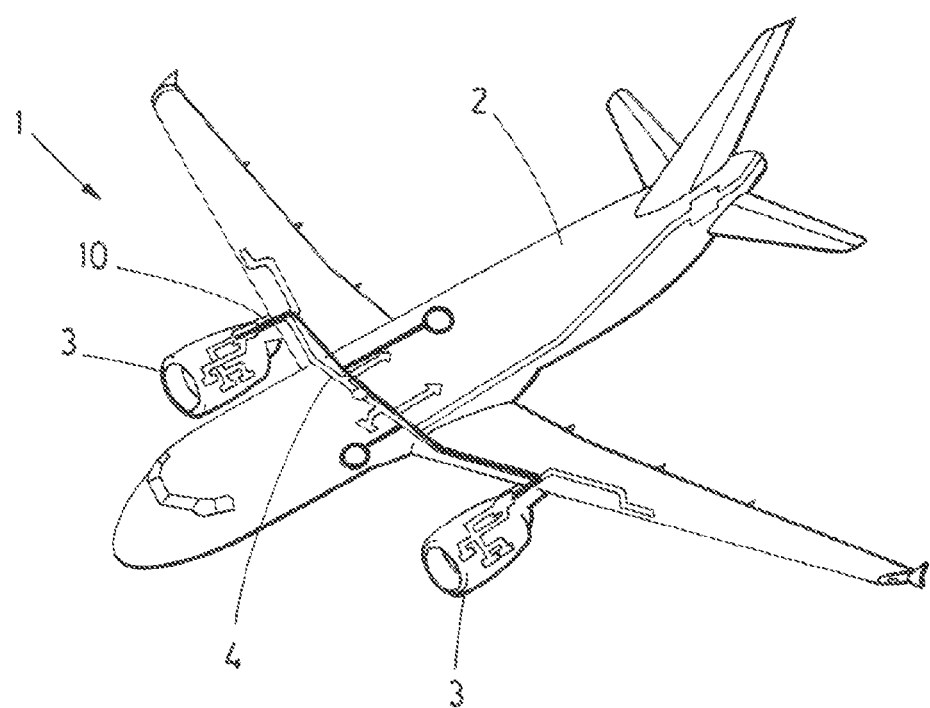
FIG. 1 is a perspective view of an aircraft incorporating a cabin air recovery system according to the invention.

FIG. 1 shows a two-engine commercial aircraft (1) comprising a pressurizable cabin (2) and two main turbofan engines (3). The invention is implemented by at least one duct (4) connecting the cabin (2) with the two main turbofan engines (3), so that cabin outflow air can be discharged into the by-pass duct downstream of the fan blades.

Figure 2:
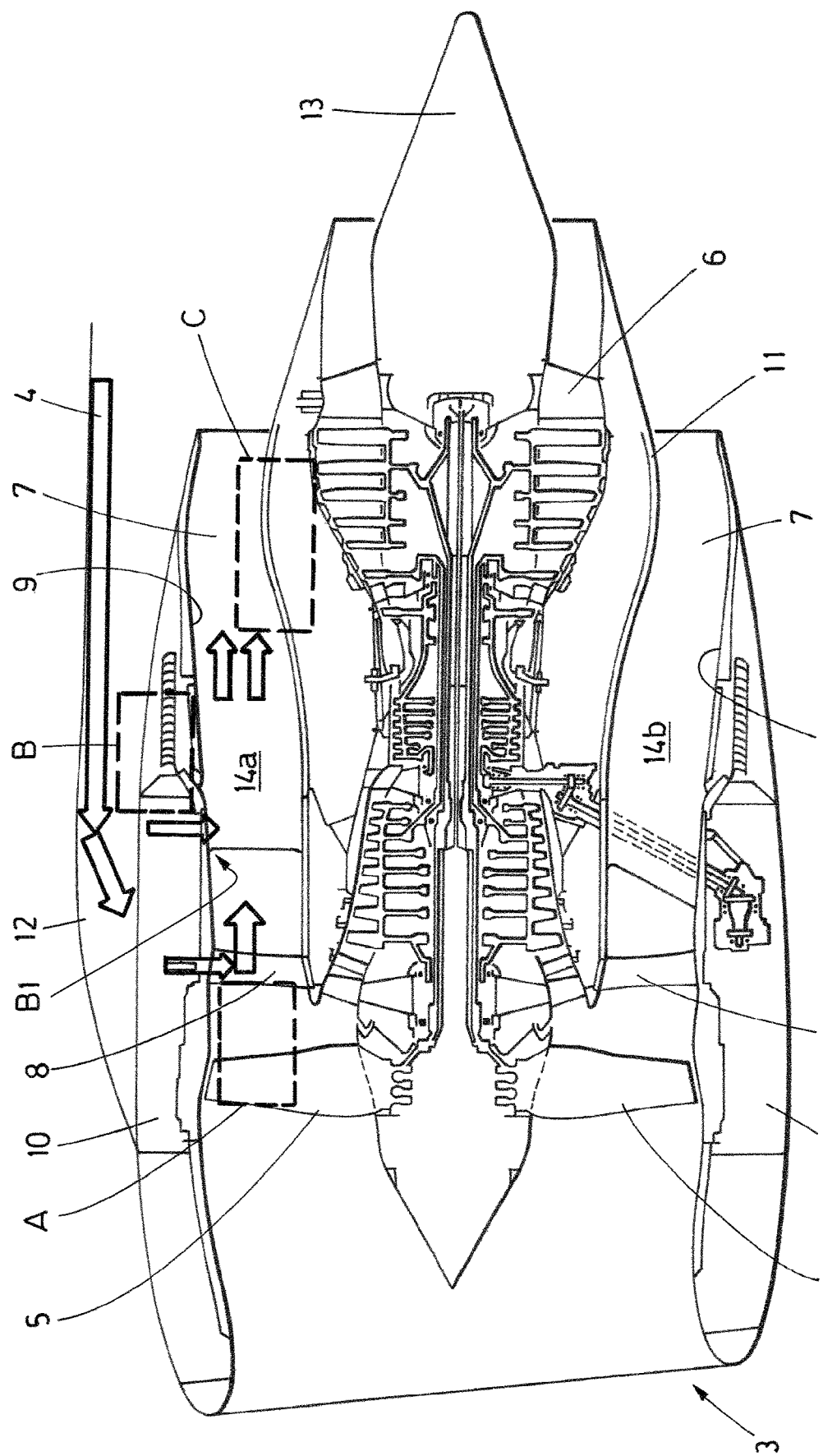
FIG. 2 shows a cross-sectional view of a conventional turbofan, wherein, different locations (A,B,C) according to the invention are shown schematically for injecting re-used cabin air into the by-pass duct.

A turbofan engine (3) is shown in FIG. 2 in more detail, which conventionally includes fan blades (5) coupled with a gas turbine (6), and a by-pass duct (7) bypassing the gas turbine (6), wherein the by-pass duct (7) is defined by a nacelle structure (10). Fan Outlet Guide Vanes (8) are arranged at the by-pass duct (7) downstream of the fan blades (5) leading to upper and lower bifurcations (14a,14b). The gas turbine (6) has a casing (11) housing the compressors, combustion chamber and shaft of the turbine (6), and exhaust cone (13).

The duct (4) is connected with a cabin pressure control system outflow valves (not shown), passes through the engine pod or pylon (12), and is connected with the by-pass duct (7), so that cabin air outflow can be discharged into the fan air flow downstream of the engine fan blades (5).

The duct (4) is equipped with a non-return valve (not shown) to avoid reverse flow, in case the fan air pressure is higher than the cabin air pressure.

As shown in FIG. 2, different locations are preferred according to the invention to discharge cabin air into the by-pass duct (7):

Option A: the cabin air is discharged at the trailing edges of the Fan Outlet Guide Vanes (8). One effect and advantage of this discharge location, is that the flow separation and turbulence at the trailing edge is reduced, which in turn reduces the vane drag and reduces the flow turbulence downstream in the bypass duct.

Option B: the cabin air is discharged downstream of the Fan Outlet Guide Vanes (8), from the by-pass duct outer surface (9) of the nacelle structure (10). One effect and advantage of this discharge location is that the momentum of the boundary layer is increased, which in turn avoids separation and hence reduces drag and pressure losses.

Figure 3:
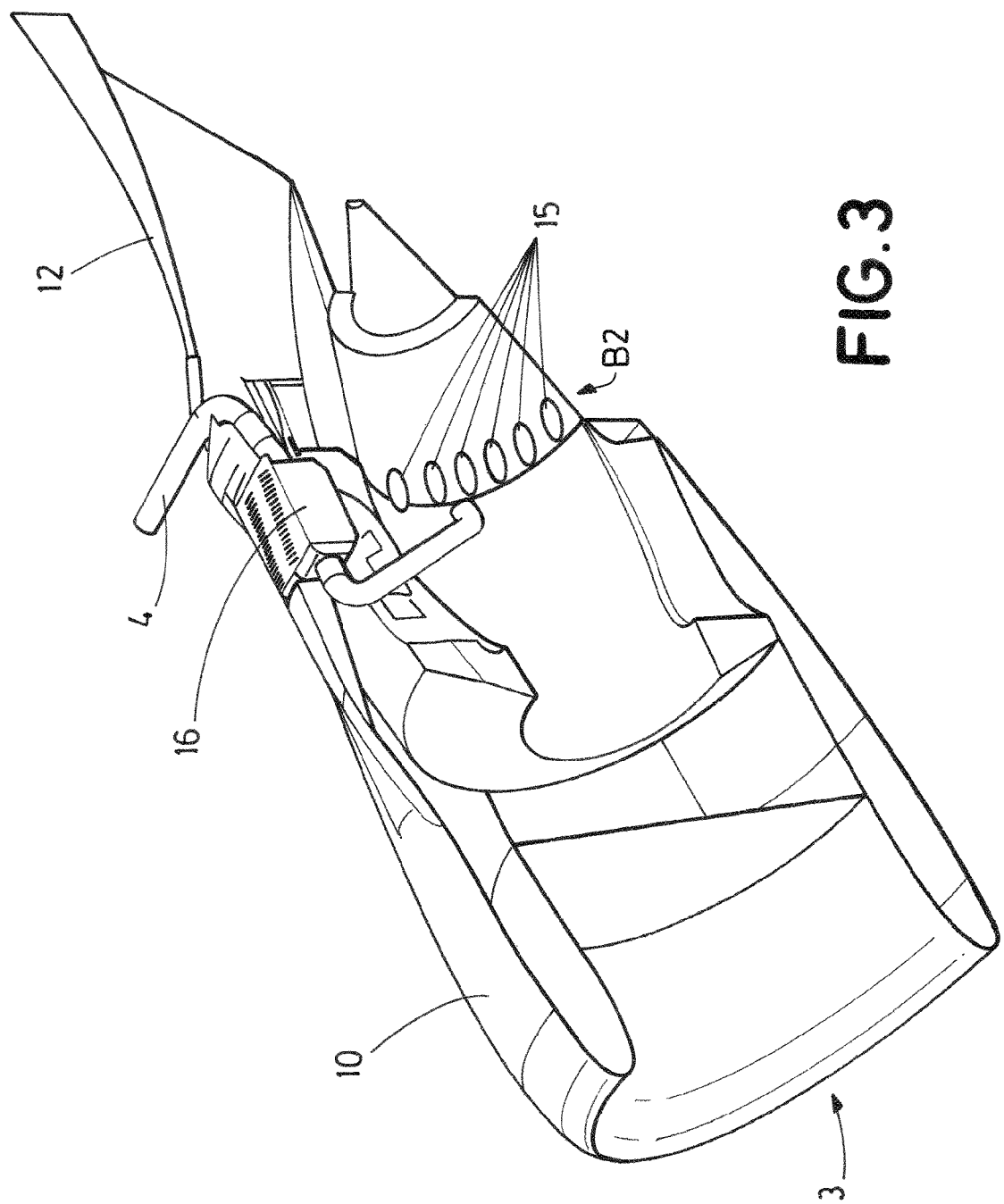
FIG. 3 shows a perspective view of a nacelle partially cut out to show the location of the discharge fine tubes.

Preferably for Option B, the discharge points are flush with the inner surface (9) of the nacelle for boundary layer control (option B.1), or alternatively (option B.2) as shown in FIG. 3, the cabin air is discharged through fine tubes (15) provided on the outer fan surface (9), and ending in a convergent nozzle shape to further accelerate the air with a suitable angle towards the fan flow discharge direction to benefit from a shear layer pushing effect.

Figure 5:
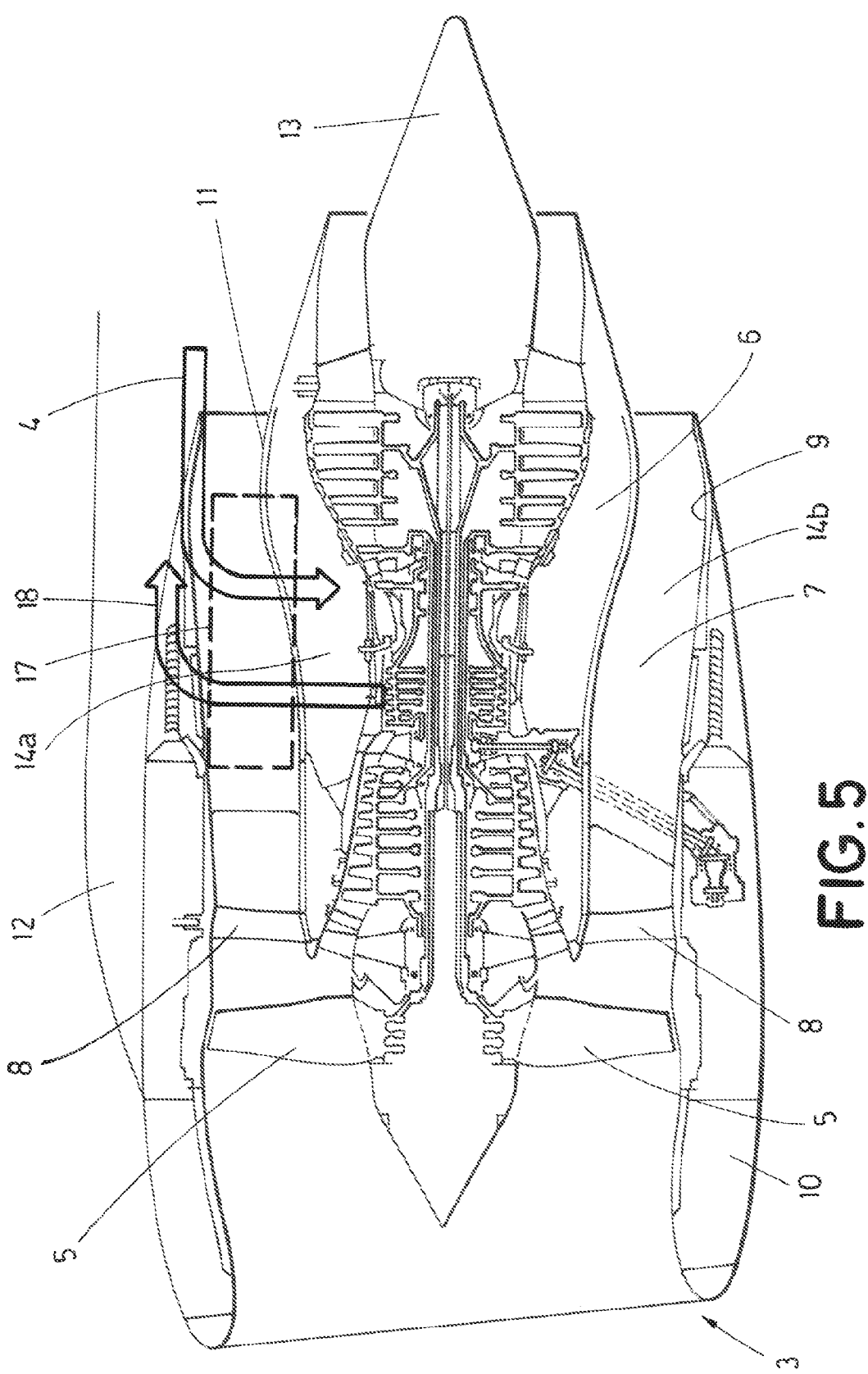
FIG. 5 shows a similar representation than FIG. 1 showing the location of the heat exchanger.

Option C: the cabin air is discharged at the upper and lower bifurcations (14a,14b) as shown in FIGS. 2 and 5. One effect and advantage of this discharge location is that flow separation and turbulence on the inner surface of the nacelle (9) is reduced in the upper and lower bifurcation which reduces the structure drag and reduces the flow turbulence downstream in the bypass duct (7).

Figure 4:
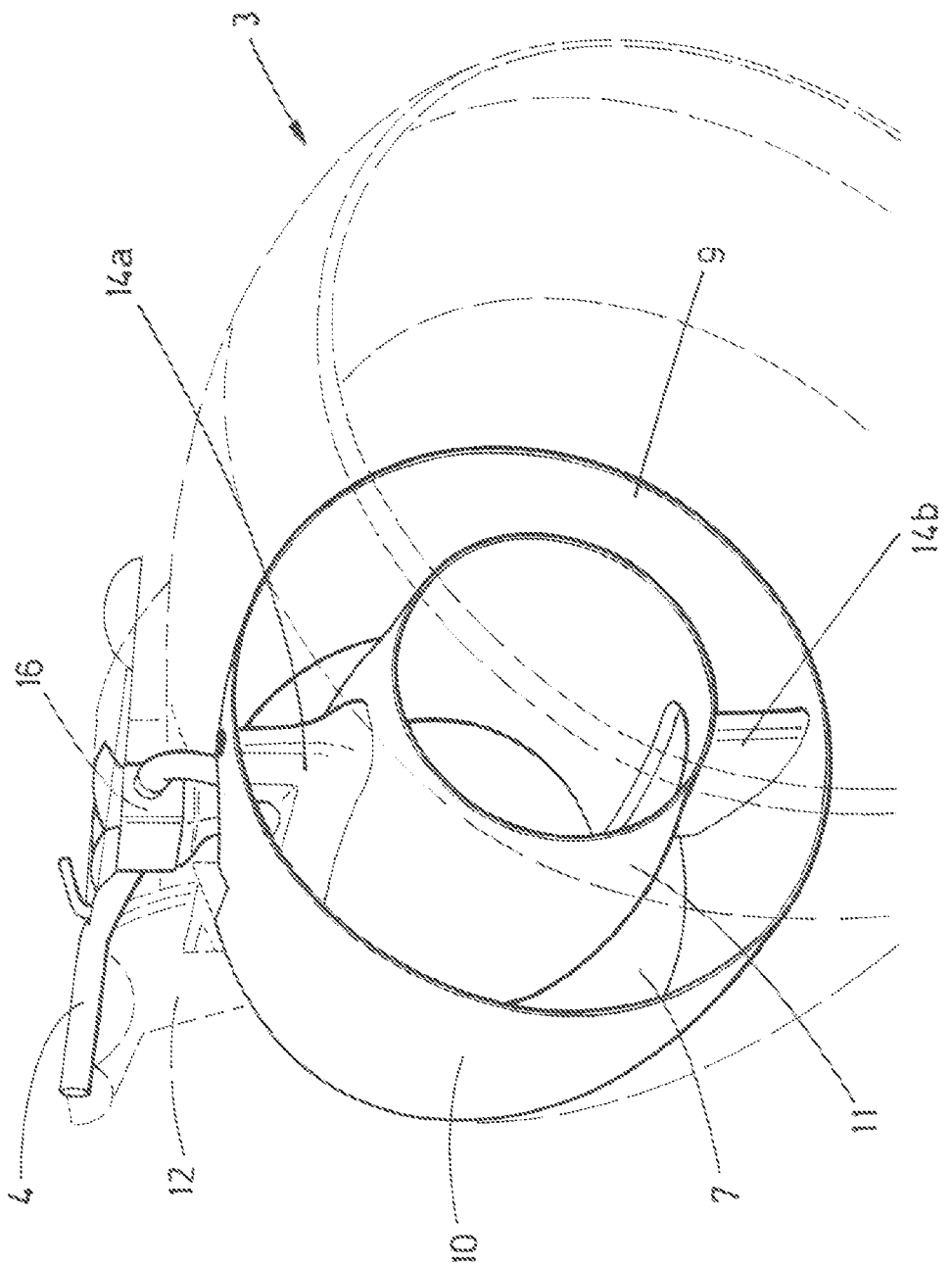
FIG. 4 shows a perspective view of a nacelle showing upper and lower bifurcations.

Additionally, upstream the discharge locations (A,B,C) into the nacelle (10), the cabin air flow is passed through a heat exchanger (16) as shown in FIGS. 3 and 4, which in one application could be the pre-cooler used by the bleed air system, or alternatively any other heat exchanger to cool down any other system. The objective in either case is to recover thermal energy via two effects:

A heat sink effect to cool down the bleed air or engine oil or any other system, thus avoiding the use of any other resource like fan air flow as a heat sink;

Since the cabin exhaust air flow is heated up, its density will decrease thus gaining air speed at the discharge locations at the by-pass duct (7) which increases the thrust recovery.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft incorporating a cabin air recovery system, the aircraft comprising:
    a pressurizable cabin,
    main turbofan engines, each turbofan engine having fan blades,
    a gas turbine coupled with the fan blades,
    a by-pass duct bypassing the gas turbine, and
    at least one duct which runs through a pylon of the aircraft and connects the cabin with the by-pass duct;
    wherein the cabin fluidly communicates with the by-pass duct via the at least one duct downstream of the fan blades, so that during operation, wherein the at least one duct discharges all cabin outflow air within the at least one duct to the by-pass duct downstream of the fan blades.

2. The aircraft according to claim 1, further comprising fan outlet guide vanes at the by-pass duct downstream of the fan blades, and wherein the at least one duct communicates with the by-pass duct at trailing edges of the fan outlet guide vanes.

3. The aircraft according to claim 2, further comprising fan outlet guide vanes at the by-pass duct downstream of the fan blades, and wherein the at least one duct communicates downstream of the fan outlet guide vanes, at a by-pass duct inner surface of a nacelle structure.

4. The aircraft according to claim 2, wherein the at least one duct communicates with upper and lower bifurcations of the by-pass duct.

5. The aircraft according to claim 2, wherein discharge points of the at least one duct are flush with an inner surface of a nacelle of the engine.

6. The aircraft according to claim 1, wherein the cabin outflow air is discharged through fine tubes ending in a divergent nozzle shape.

7. The aircraft according to claim 1, further comprising a heat exchanger and wherein the cabin air outlet flow is passed through the heat exchanger.

* * * * *